US012789863B2

(12) United States Patent
Cheng et al.

(10) Patent No.: US 12,789,863 B2
(45) Date of Patent: Nov. 10, 2026

(54) ADJUSTABLE TORSION BAR SYSTEM AND ANTI-ROLL METHOD

(71) Applicant: Zhuzhou Times New Material Technology Co., Ltd., Hunan (CN)

(72) Inventors: Haitao Cheng, Hunan (CN); Yan Luo, Hunan (CN); Jun Zhou, Hunan (CN); Wei Li, Hunan (CN); Canhui Chen, Hunan (CN); Sheng Lin, Hunan (CN); Te Ye, Hunan (CN); Huan Liu, Hunan (CN); Xiang Yin, Hunan (CN); Wensong Liu, Hunan (CN)

(73) Assignee: Zhuzhou Times New Materials Technology Co., Ltd., Hunan (CN)

( * ) Notice: Subject to any disclaimer, the term of this patent is extended or adjusted under 35 U.S.C. 154(b) by 471 days.

(21) Appl. No.: 18/567,026

(22) PCT Filed: Apr. 29, 2022

(86) PCT No.: PCT/CN2022/090557
§ 371 (c)(1),
(2) Date: Dec. 5, 2023

(87) PCT Pub. No.: WO2023/206469
PCT Pub. Date: Nov. 2, 2023

(65) Prior Publication Data

US 2024/0367699 A1 Nov. 7, 2024

(51) Int. Cl.
*B61F 5/24* (2006.01)
*B61F 5/38* (2006.01)

(52) U.S. Cl.
CPC ................ *B61F 5/24* (2013.01); *B61F 5/245* (2013.01); *B61F 5/386* (2013.01); *B60G 2202/134* (2013.01); *B60G 2202/135* (2013.01)

(58) Field of Classification Search
CPC .... B61F 5/22; B61F 5/24; B61F 5/245; B61F 5/50; B61F 5/386; B61F 5/127;
(Continued)

(56) References Cited

U.S. PATENT DOCUMENTS

| | | | | |
|---|---|---|---|---|
| 6,520,510 B1 * | 2/2003 | Germain | ............ | B60G 21/0555 280/124.157 |
| 7,055,832 B2 * | 6/2006 | Germain | ............ | B60G 17/0162 280/5.511 |

(Continued)

FOREIGN PATENT DOCUMENTS

| | | |
|---|---|---|
| CN | 205971343 | 2/2017 |
| CN | 206141565 | 5/2017 |

(Continued)

OTHER PUBLICATIONS

"International Search Report (Form PCT/ISA/210) of PCT/CN2022/090557," mailed on Jan. 18, 2023, with English translation thereof, pp. 1-4.

*Primary Examiner* — Cheng Lin
(74) *Attorney, Agent, or Firm* — JCIPRNET

(57) ABSTRACT

The present invention relates to an adjustable torsion bar system and an anti-roll method, the adjustable torsion bar system is formed through the adjustable hydraulic connecting rods; and by controlling the flow of the liquid media, the characteristics of the hydraulic connecting rods are changed so that the length of the connecting rods has the characteristics of unchanged, unidirectional follow-up elongation or unidirectional follow-up shortening. Thus, the anti-rolling torsion bar system can provide the bidirectional anti-rolling torque or unidirectional anti-rolling torque to satisfy the safety driving requirements of the railway vehicle on different rails.

9 Claims, 15 Drawing Sheets

(58) Field of Classification Search

CPC .......... B60G 21/0555; B60G 2202/135; B60G 2202/134; B60G 2202/1351; B60G 21/0558

See application file for complete search history.

(56) References Cited

U.S. PATENT DOCUMENTS

| | | | | | |
|---|---|---|---|---|---|
| 7,234,714 | B2 * | 6/2007 | Germain | B60G 21/055 | 280/124.152 |
| 7,293,780 | B2 * | 11/2007 | Germain | B60G 21/0553 | 280/5.506 |
| 7,559,563 | B2 * | 7/2009 | Minoshima | B60G 21/0555 | 280/124.106 |
| 7,694,984 | B2 * | 4/2010 | Germain | B60G 21/0555 | 280/124.16 |
| 7,862,052 | B2 * | 1/2011 | Germain | B60G 21/0555 | 280/5.506 |
| 7,997,588 | B2 * | 8/2011 | Ohnuma | B60G 21/0556 | 280/124.16 |
| 2008/0140284 | A1 * | 6/2008 | Germain | B60G 21/0555 | 701/38 |

FOREIGN PATENT DOCUMENTS

| | | | | | |
|---|---|---|---|---|---|
| CN | 206265060 | | | 6/2017 | |
| CN | 110329298 | | | 10/2019 | |
| CN | 112158224 | | | 1/2021 | |
| CN | 112644538 | | | 4/2021 | |
| CN | 112644538 | A | * | 4/2021 | B61F 5/24 |
| CN | 112810651 | | | 5/2021 | |
| CN | 112810651 | A | * | 5/2021 | B61F 5/50 |
| CN | 112896214 | | | 6/2021 | |
| CN | 112896214 | A | * | 6/2021 | B61F 5/24 |
| CN | 114261417 | | | 4/2022 | |
| CN | 114261417 | A | * | 4/2022 | |
| CN | 117341757 | A | * | 1/2024 | B61F 5/24 |
| EP | 1000782 | A2 | * | 5/2000 | B60G 17/04 |
| EP | 3708454 | | | 9/2020 | |
| GB | 2356606 | A | * | 5/2001 | B60G 21/0555 |
| JP | 2006137294 | | | 6/2006 | |

* cited by examiner

ADJUSTABLE TORSION BAR SYSTEM AND ANTI-ROLL METHOD

CROSS-REFERENCE TO RELATED APPLICATION

This application is a 371 of international application of PCT application serial no. PCT/CN2022/090557, filed on Apr. 29, 2022. The entirety of the above-mentioned patent application is hereby incorporated by reference herein and made a part of this specification.

BACKGROUND

Technical Field

The present invention relates to the technical field of railway vehicles, and particularly relates to an adjustable torsion bar system and an anti-roll method.

Description of Related Art

With the continuous improvement of requirements for vehicle operating speed and riding comfort, the existing vehicle suspension system is difficult to satisfy the safety and comfort requirements when a train passes through a curve at high speed. A tilting train can enable a vehicle body to actively tilt before the train reaches the curve, and to balance the centrifugal force on the curve by its own gravity, so compared with the traditional railway transit vehicles, the tilting train can better solve the problems of safety and comfort when passing through the curve at high speed.

An anti-rolling torsion bar is used to prevent the rolling of the railway vehicles caused by passage through the curve, strong wind and bump to ensure driving safety. When the vehicle body is in the active tilting, the anti-rolling torsion bar will hinder the vehicle body from the active tilting. Thus, it is necessary to improve the anti-rolling torsion bar.

When the railway vehicle is driven on a straight line or large curvature radius route, the anti-rolling torsion bar is required to provide a bidirectional anti-rolling torque to prevent the vehicle body from rolling to both sides; when the railway vehicle is driven on a small curvature radius route, the anti-rolling torsion bar is required to match with an air spring system to enable the vehicle body to tilt toward the inner side of the curve and to provide unidirectional anti-rolling torque to prevent the vehicle body from rolling toward the outer side of the curve. The anti-rolling torsion bar is required to provide the bidirectional anti-rolling torque and unidirectional anti-rolling torque to satisfy the safety driving requirements of the railway vehicle on different rails.

Through patent retrieval, the following patents are mainly related to the present application:

1. Chinese invention patent with application No. "201910683078.0", application date "2019 Jul. 26", publication No. "CN110329298A", publication date "2019 Oct. 15", title "a self-positioning adjustment method and device of an anti-rolling torsion bar" and applicant "Zhuzhou Times New Material Technology Co., Ltd." In the patent for invention, the anti-rolling torsion bar connecting rod is divided into two parts from the middle, and connected through a self-positioning adjustment device in the middle of the two parts of the connecting rod, to form an anti-rolling torsion bar connecting rod with a self-positioning adjustment device; a self-positioning adjustment device with adjusting connecting rod length and self-positioning adjustment device is installed in the middle of the two parts of the connecting rod; the two parts of the connecting rod are connected through the self-positioning adjustment device with adjusting rod length and self-positioning adjusting device, so as to avoid affecting the life of connecting rod nodes due to the relative position deviation of the upper and lower connecting rod nodes of the adjustable vertical connecting rod during loading; meanwhile, the maintenance process of the product can be optimized, and the product overhaul can be completed by replacing the lock nuts without taking additional tooling. However, the length of the connecting rod in the patent can only be adjusted during installation or maintenance, cannot realize real-time unidirectional follow-up adjustment, and cannot provide unidirectional anti-rolling torque.

2. Chinese invention patent with application No. "202011125612.5", application date "2020 Oct. 20", publication No. "CN112158224A", publication date "2021 Jan. 1", title "a real-time active adjustment method of connecting rod length and an active anti-rolling torsion bar system" and applicant "Zhuzhou Times New Material Technology Co., Ltd." The patent for invention relates to a real-time active adjustment method of connecting rod length: an active adjustment device is installed on the connecting rod, which can adjust the length of the connecting rod actively in real time according to the control instruction. Thus, the defect that the length of the traditional connecting rod is fixed and unadjustable is solved. The present invention further relates to an active anti-rolling torsion bar system, comprising: a connecting rod, a torsion bar and a supporting seat. The connecting rod is provided with a ball screw mechanism, which can adjust the length of the connecting rod rapidly in real time according to the control instructions, so that the torsion bar generates torsion deformation and then actively provides the anti-rolling torque for the vehicle body to realize the active adjustment of the rolling angle of the vehicle body, which helps to improve the speed and the safety of the train when passing through a curve, thereby increasing the operating speed of the train. However, the length of the connecting rod in the patent can only be adjusted actively, cannot realize unidirectional follow-up elongation or unidirectional follow-up shortening, and cannot provide unidirectional anti-rolling torque.

3. Chinese invention patent with application No. "202110004969.6", application date "2021 Jan. 4", publication No. "CN112644538A", publication date "2021 Apr. 13", title "a passive adjustment method of connecting rod length and a passive control torsion bar system" and applicant "Zhuzhou Times New Material Technology Co., Ltd." The patent for invention relates to a passive adjustment method of connecting rod length: a passive adjustment device is installed on the connecting rod, which can be converted between two states of releasing and locking in real time according to the control instruction so that the connecting rod length can be adjusted or kept fixed. The present invention further relates to a passive control torsion bar system, comprising: a connecting rod, a torsion bar and a supporting seat. The connecting rod is provided with a passive adjustment device which can be converted between two states of releasing and locking in real time according to the control instruction so that the connecting rod length can be adjusted or kept fixed. When the vehicle is driven on a straight line or a large curvature radius route, the connecting rod length is kept fixed, so that the torsion bar system plays the anti-rolling role of the traditional torsion bar. When the vehicle passes through a curve, the connecting rod length can be freely elongated and shortened with the active tilting system to adjust the side rolling angle of the vehicle body in cooperation with the tilting system. However, the connecting rod in the patent can only be converted between locking and free elongation and shortening, and the length of the connecting rod cannot realize unidirectional follow-up elongation or unidirectional follow-up shortening, and cannot provide unidirectional anti-rolling torque.

4. Patent for utility model with application No. "201621408157.9", application date "2016 Dec. 21", publication No. "CN206265060U", publication date "2017 Jun. 20", title "an adjustable anti-rolling torsion bar connecting rod" and applicant "Nanjing Railway New Technology Co., Ltd." The patent for utility model discloses an adjustable anti-rolling torsion bar connecting rod, comprising a connecting rod shaft, a connecting rod joint, a knuckle bearing, a retaining ring, etc. Both ends of the connecting rod shaft are connected with the knuckle bearing; side surfaces of both ends of the connecting rod shaft comprise a connecting rod inner hole and an inner hole groove; a retaining ring is arranged in the inner hole groove; and the knuckle bearing is inserted into the connecting rod inner hole. The connecting rod joint is also arranged on the connecting rod shaft, and the connecting rod joint is arranged at one end of the connecting rod. However, the length of the connecting rod in the patent can only be adjusted during installation or maintenance, cannot realize real-time unidirectional follow-up adjustment, and cannot provide unidirectional anti-rolling torque.

5. Patent for utility model with application No. "201621166973.3", application date "2016 Nov. 2", publication No. "CN206141565U", publication date "2017 May 3", title "an anti-rolling torsion bar device for a linear motor vehicle with an adjustable vertical connecting rod" and applicant "Zhuzhou Times New Material Technology Co., Ltd." The patent for utility model discloses an anti-rolling torsion bar device for a linear motor vehicle with an adjustable vertical connecting rod, comprising a torsion bar shaft, a torsion arm, a supporting seat composition and a vertical connecting rod. The vertical connecting rod comprises a left-turning ball head, a vertical connecting rod and a right-turning ball head. The upper end and the lower end of the vertical connecting rod are arranged as tubes with internal threads, and the internal threads at both ends of the vertical connecting rod are opposite. The left-turning ball head and the right-turning ball head are respectively connected to the upper end and the lower end of the vertical connecting rod by means of threaded connection. However, the length of the connecting rod in the patent can only be adjusted during installation or maintenance, cannot realize real-time unidirectional follow-up adjustment, and cannot provide unidirectional anti-rolling torque.

However, the above patent is different from the technical solution in the present application, and the length of the connecting rods cannot realize real-time unidirectional follow-up adjustment, and cannot provide unidirectional anti-rolling torque.

SUMMARY

A technical problem to be solved in the present invention is to overcome the defects in the prior art, to provide an adjustable torsion bar system and an anti-roll method.

To solve the above technical problems, the present invention adopts the following technical solution: an adjustable torsion bar system comprises: a torsion bar, a left connecting rod and a right connecting rod; the torsion bar is fixed on a bogie/vehicle body; both ends of the torsion bar are hinged with one end of the left connecting rod and the right connecting rod respectively; and the other ends of the left connecting rod and the right connecting rod are hinged with both sides of the vehicle body/bogie respectively. The left connecting rod and the right connecting rod are adjustable hydraulic connecting rods. The length of the connecting rods can be transformed between the states of fixedness and unidirectional follow-up elongation or unidirectional follow-up shortening so that the torsion bar system provides a bidirectional anti-rolling torque or unidirectional anti-rolling torque to satisfy the safety driving requirements of the railway vehicle on different rails.

Further, each hydraulic connecting rod comprises: a rod body, a piston and a control component; the piston is movably arranged in the rod body; the rod body is divided into a liquid cavity I and a liquid cavity II: the liquid cavity I and the liquid cavity II are filled with liquid media; The liquid cavity I and the liquid cavity II are connected or disconnected through the control component and a flow channel so that the length of the connecting rods is unchanged, is freely elongated or shortened and can realize unidirectional follow-up elongation or unidirectional follow-up shortening, so as to change the characteristics of the hydraulic connecting rods.

Further, a rod I is arranged in the liquid cavity I, one end of the rod I is connected with one side of the piston, and the other end of the rod I hermetically penetrates out from the liquid cavity I; a rod II is arranged in the liquid cavity II, one end of the rod II is connected with the other side of the piston, and the other end of the rod II hermetically penetrates out from the liquid cavity II; the rod I and the rod II are cylindrical, and the diameter of the rod I is the same as the diameter of the rod II; the rod I and the rod II move with the piston in the rod body; and when the piston moves in the rod body, the reduced volume or increased volume of the liquid cavity I is equal to the increased volume or reduced volume of the liquid cavity II. The hydraulic connecting rods do not need a hydraulic station or oil source, do not need other liquid storage containers, and have simple structure and adjustable connecting rod length.

Further, the flow channel comprises a flow channel I and a flow channel II, and the control component comprises straight-through valves and check valves; a straight-through valve I and a check valve I are arranged on the flow channel I; the liquid media in the liquid cavity I can only flow to the liquid cavity II through the check valve I and the straight-through valve I; a straight-through valve II and a check valve II are arranged on the flow channel II; and the liquid media in the liquid cavity II can only flow to the liquid cavity I through the check valve II and the straight-through valve II. By controlling the unidirectional flow of the liquid media, the length of the connecting rods can realize unidirectional follow-up elongation or unidirectional follow-up shortening.

Further, the length of the connecting rods remains unchanged when the straight-through valve I and the straight-through valve II are both disconnected, so that the torsion bar system can provide the bidirectional anti-rolling torque.

Further, when the straight-through valve I is connected and the straight-through valve II is disconnected, the liquid media in the liquid cavity I can only flow to the liquid cavity II through the flow channel I, the liquid media in the liquid cavity II cannot flow to the liquid cavity I and the length of the connecting rod is freely elongated under the action of tension; and when the tension is converted into pressure, the length of the connecting rod remains unchanged, and the hydraulic connecting rod is in a state of unidirectional follow-up elongation.

Further, when the straight-through valve I is disconnected and the straight-through valve II is connected, the liquid media in the liquid cavity II can only flow to the liquid cavity I through the flow channel II, the liquid media in the liquid cavity I cannot flow to the liquid cavity II and the length of the connecting rod is freely shortened under the action of pressure; and when the pressure is converted into tension, the length of the connecting rod remains unchanged, and the hydraulic connecting rod is in a state of unidirectional follow-up shortening.

The present application further relates to an anti-roll method: when the railway vehicle is driven on a straight rail or the vehicle does not need to actively tilt, the adjustable torsion bar system is controlled to be in a bidirectional anti-rolling state, and the adjustable torsion bar system provides the bidirectional anti-rolling torque; when the railway vehicle needs to actively tilt, the adjustable torsion bar system is controlled to be in a unidirectional anti-rolling state, and the adjustable torsion bar system may not prevent the railway vehicle from tilting to the inner side of the curve. Once the railway vehicle has a tendency to roll to the outer side of the curve, the adjustable torsion bar system provides the unidirectional anti-rolling torque to prevent the railway vehicle from rolling to the outer side of the curve to ensure the driving safety.

Further, when the railway vehicle is driven in a straight line, a left straight-through valve I and a left straight-through valve II are controlled to be in a disconnected state, and the length of the left connecting rod is kept unchanged; and a right straight-through valve I and a right straight-through valve II are controlled to be in a disconnected state, and the length of the right connecting rod is kept unchanged. At this moment, the adjustable torsion bar system provides the bidirectional anti-rolling torque.

Further, when the railway vehicle is driven in a left-turning transition curve, the left straight-through valve I and the left straight-through valve II are controlled to be in a disconnected state, and the length of the left connecting rod is kept unchanged; or the left straight-through valve I is controlled to be in a disconnected state, the left straight-through valve II is controlled to be in a connected state, and the left connecting rod is controlled to be in a unidirectional follow-up shortening state; the right straight-through valve I is controlled to be in a connected state, the right straight-through valve II is controlled to be in a disconnected state, and the right connecting rod is controlled to be in a unidirectional follow-up elongation state. At this time, the adjustable torsion bar system may not prevent the railway vehicle from rolling to the left, and only provides a right anti-rolling torque to prevent the railway vehicle from rolling to the right.

When the railway vehicle is driven on a left-turning curve, the left straight-through valve I and the left straight-through valve II are controlled to be in a disconnected state, and the length of the left connecting rod is kept unchanged; and the right straight-through valve I and the right straight-through valve II are controlled to be in a disconnected state, and the length of the right connecting rod is kept unchanged. At this moment, the adjustable torsion bar system provides the bidirectional anti-rolling torque to prevent the railway vehicle from conducting bidirectional rolling.

When the railway vehicle leaves the left-turning curve and enters a left-turning transition curve, the left straight-through valve I and the left straight-through valve II are controlled to be in a disconnected state, and the length of the left connecting rod is kept unchanged; or the left straight-through valve I is controlled to be in a connected state, the left straight-through valve II is controlled to be in a disconnected state and the left connecting rod is controlled to be in a unidirectional follow-up elongation state; and the right straight-through valve I is controlled to be in a disconnected state, the right straight-through valve II is controlled to be in a connected state and the right connecting rod is controlled to be in a unidirectional follow-up contraction state. At this moment, the adjustable torsion bar system provides a left anti-rolling torque only to prevent the railway vehicle from rolling to the left, without preventing the railway vehicle from returning to a horizontal state from a left tilting state.

When the railway vehicle leaves the left-turning transition curve and enters a straight line, the left straight-through valve I and the left straight-through valve II are controlled to be in a disconnected state, and the length of the left connecting rod is kept unchanged; the right straight-through valve I and the right straight-through valve II are controlled to be in a disconnected state, and the length of the right connecting rod is kept unchanged. At this moment, the adjustable torsion bar system provides the bidirectional anti-rolling torque.

When the railway vehicle is driven on a right-turning transition curve, the left straight-through valve I is controlled to be in a connected state, the left straight-through valve II is controlled to be in a disconnected state and the left connecting rod is controlled to be in a unidirectional follow-up elongation state; the right straight-through valve I and the right straight-through valve II are controlled to be in a disconnected state, and the length of the right connecting rod is kept unchanged; or the right straight-through valve I is controlled to be in a disconnected state, the right straight-through valve II is controlled to be in a connected state, and the right connecting rod is controlled to be in a unidirectional follow-up shortening state. At this time, the adjustable torsion bar system may not prevent the railway vehicle from rolling to the right, and only provides a left anti-rolling torque to prevent the railway vehicle from rolling to the left.

When the railway vehicle is driven on a right-turning curve, the left straight-through valve I and the left straight-through valve II are controlled to be in a disconnected state, and the length of the left connecting rod is kept unchanged; the right straight-through valve I and the right straight-through valve II are controlled to be in a disconnected state, and the length of the right connecting rod is kept unchanged. At this moment, the adjustable torsion bar system provides the bidirectional anti-rolling torque to prevent the railway vehicle from conducting bidirectional rolling.

When the railway vehicle leaves the right-turning curve and enters a right-turning transition curve, the left straight-through valve I is controlled to be in a disconnected state, the left straight-through valve II is controlled to be in a connected state and the left connecting rod is controlled to be in a unidirectional follow-up shortening state; the right straight-through valve I and the right straight-through valve II are controlled to be in a disconnected state, and the length of the right connecting rod is kept unchanged; or the left straight-through valve I is controlled to be in a connected state, the left straight-through valve II is controlled to be in a disconnected state and the left connecting rod is controlled to be in a unidirectional follow-up elongation state. At this moment, the adjustable torsion bar system provides the right anti-rolling torque only to prevent the railway vehicle from rolling to the right, without preventing the railway vehicle from returning to the horizontal state from the right tilting state.

When the railway vehicle leaves the right-turning transition curve and enters a straight line, the left straight-through valve I and the left straight-through valve II are controlled to be in a disconnected state, and the length of the left connecting rod is kept unchanged; the right straight-through valve I and the right straight-through valve II are controlled to be in a disconnected state, and the length of the right connecting rod is kept unchanged. At this moment, the adjustable torsion bar system provides the bidirectional anti-rolling torque.

The present invention has the beneficial effects: the adjustable torsion bar system is formed through the adjustable hydraulic connecting rods; and by controlling the flow of the liquid media, the characteristics of the hydraulic connecting rods are changed so that the length of the connecting rods has the characteristics of unchanged, unidirectional follow-up elongation or unidirectional follow-up shortening. Thus, the anti-rolling torsion bar system can provide the bidirectional anti-rolling torque or unidirectional anti-rolling torque to satisfy the safety driving requirements of the railway vehicle on different rails.

DESCRIPTION OF THE EMBODIMENTS

The present invention is further described below through specific embodiments in combination with drawings.

Figure 1:
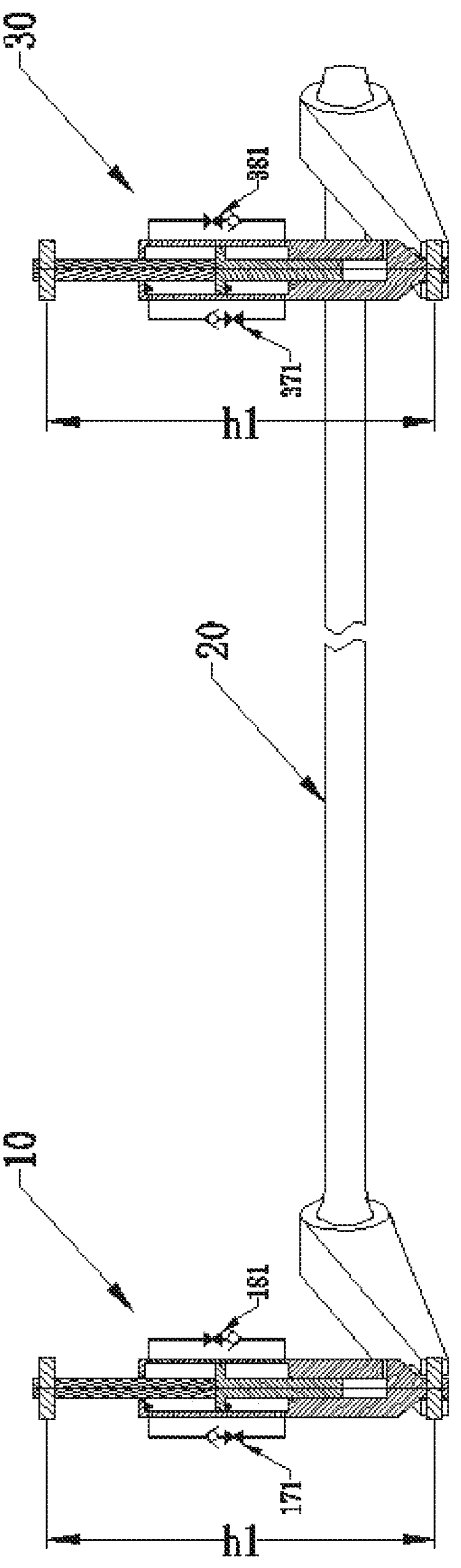
FIG. 1 is a schematic diagram of a torsion bar system.

The adjustable torsion bar system, as shown in FIG. 1, comprises: a torsion bar 20, a left connecting rod 10 and a right connecting rod 30. The torsion bar 20 is fixed on a bogie/vehicle body; both ends of the torsion bar 20 are hinged with one end of the left connecting rod 10 and the right connecting rod 30 respectively; and the other ends of the left connecting rod 10 and the right connecting rod 30 are hinged with both sides of the vehicle body/bogie respectively. The left connecting rod 10 and the right connecting rod 30 are adjustable hydraulic connecting rods. The length of the connecting rods can be transformed between the states of fixedness and unidirectional follow-up elongation or unidirectional follow-up shortening so that the torsion bar system provides a bidirectional anti-rolling torque or unidirectional anti-rolling torque to satisfy the safety driving requirements of the railway vehicle on different rails.

Figure 2:
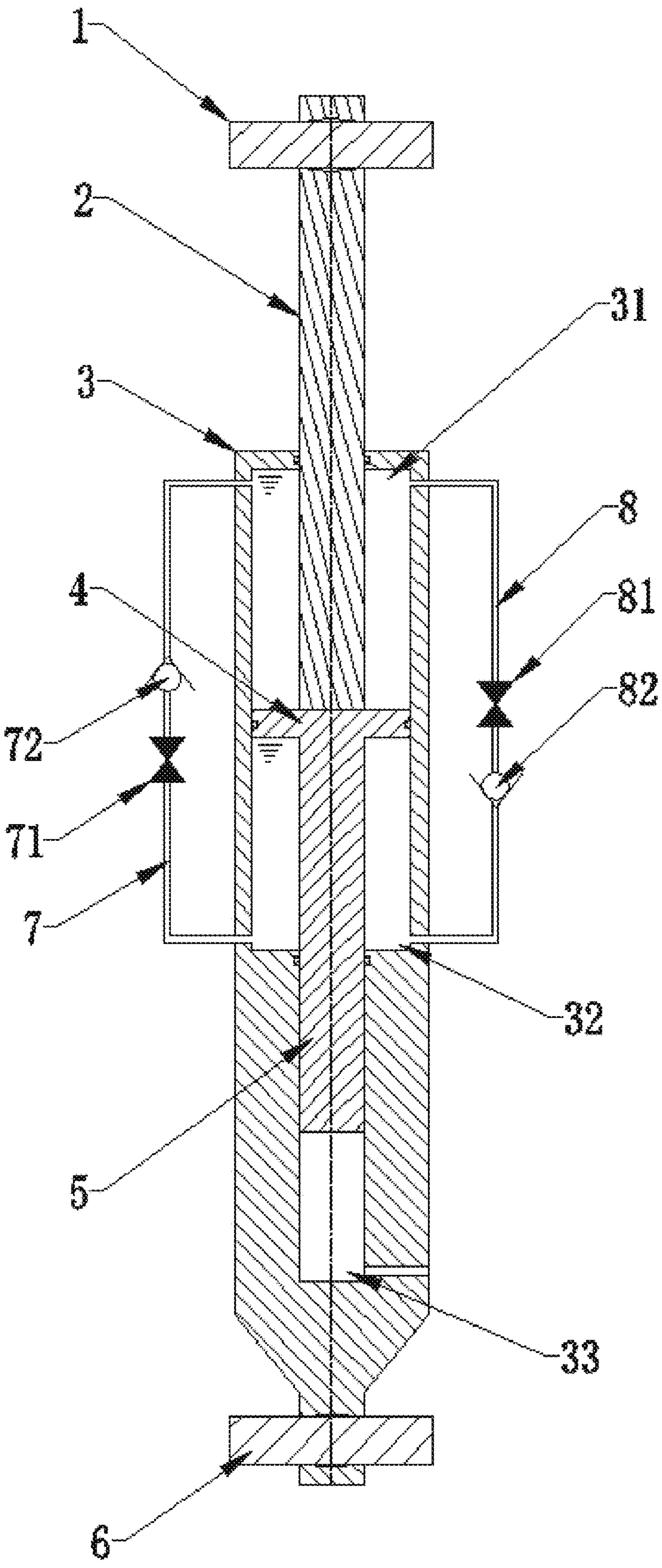
FIG. 2 is a schematic diagram when the length of a hydraulic connecting rod is unchanged.

The hydraulic connecting rod is shown in FIG. 2: the hydraulic connecting rod comprises: a spherical hinge I1, a rod I 2, a rod body 3, a piston 4, a rod II 5, a spherical hinge II 6, a flow channel I 7 and a flow channel II 8; the flow channel I 7 is provided with a straight-through valve I 71 and a check valve I 72 and the flow channel II 8 is provided with a straight-through valve II 81 and a check valve II 82.

The piston 4 is movably arranged in the rod body 3; the rod body 3 is divided into a liquid cavity I 31 and a liquid cavity II 32; and the liquid cavity I 31 and the liquid cavity II 32 are filled with liquid media. The rod I 2 is arranged in the liquid cavity I 31, the rod I 2 is connected with the piston 4 by threads, and the other end of the rod I 2 hermetically penetrates out from the liquid cavity I 31; the rod II 5 is arranged in the liquid cavity II 32, the rod II 5 is integrally formed with the piston 4, and the other end of the rod II 5 hermetically penetrates out from the liquid cavity II 32; the rod I 2 and the rod II 5 are cylindrical, the rod I 2 and the rod II 5 move with the piston 4 in the rod body 3 and the diameter of the rod I 2 is the same as the diameter of the rod II 5. A balancing cavity 33 is arranged in the rod body 3 along the moving direction of the piston 4, and the other end of the rod II 5 is movably arranged in the balancing cavity 33; and the balancing cavity 33 is communicated with the atmosphere through a vent.

The liquid cavity I 31 is communicated with the liquid cavity II 32 through the flow channel I 7 and the flow channel II 8. When the piston 4 moves in the rod body 3, the liquid media flow only between the liquid cavity I 31 and the liquid cavity II 32. The reduced volume or increased volume of the liquid cavity I 31 is equal to the increased volume or reduced volume of the liquid cavity II 32.

The straight-through valve I 71 and the check valve I 72 are arranged on the flow channel I 7, and the liquid media in the liquid cavity I 31 can only flow to the liquid cavity II 32 through the check valve I 72 and the straight-through valve I 71. The straight-through valve I 71 adopts a normally closed solenoid valve. The straight-through valve I 71 is integrated with the check valve I 72 and installed on the outer circumference of the rod body 3. The straight-through valve II 81 and the check valve II 82 are arranged on the flow channel II 8. The straight-through valve II 81 is integrated with the check valve II 72 and installed on the outer circumference of the rod body 3. The liquid media in the liquid cavity II 32 can only flow to the liquid cavity I 31 through the check valve II 82 and the straight-through valve II 81. The straight-through valve II 81 adopts a normally closed solenoid valve.

When the length of the connecting rod remains unchanged, as shown in FIG. 2: then, the straight-through valve I 71 and the straight-through valve II 81 are disconnected, and the liquid media cannot flow between the liquid cavity I 31 and the liquid cavity II 32. If the hydraulic connecting rod bears tension, the rod I 2 has a tendency to drive the piston 4 to move upward. Because the liquid media are almost incompressible, the pressure in the liquid cavity I 31 increases sharply at this time and the pressure in the liquid cavity II 32 is decreased to form negative pressure. A downward pressure difference is formed on both sides of the piston 4, and the pressure difference acts on the piston 4 to form a downward balance force which is balanced with the tension borne by the hydraulic connecting rod. The piston 4 may not move, so that the length of the connecting rod remains unchanged.

Conversely, if the hydraulic connecting rod bears pressure, the rod I 2 has a tendency to drive the piston 4 to move downward. The pressure in the liquid cavity I 31 is decreased to form negative pressure, and the pressure in the liquid cavity II 32 is increased sharply. An upward pressure difference is formed on both sides of the piston 4, and the pressure difference acts on the piston 4 to form an upward balance force which is balanced with the pressure borne by the hydraulic connecting rod. The piston 4 also may not move, so that the length of the connecting rod remains unchanged.

Figure 3:
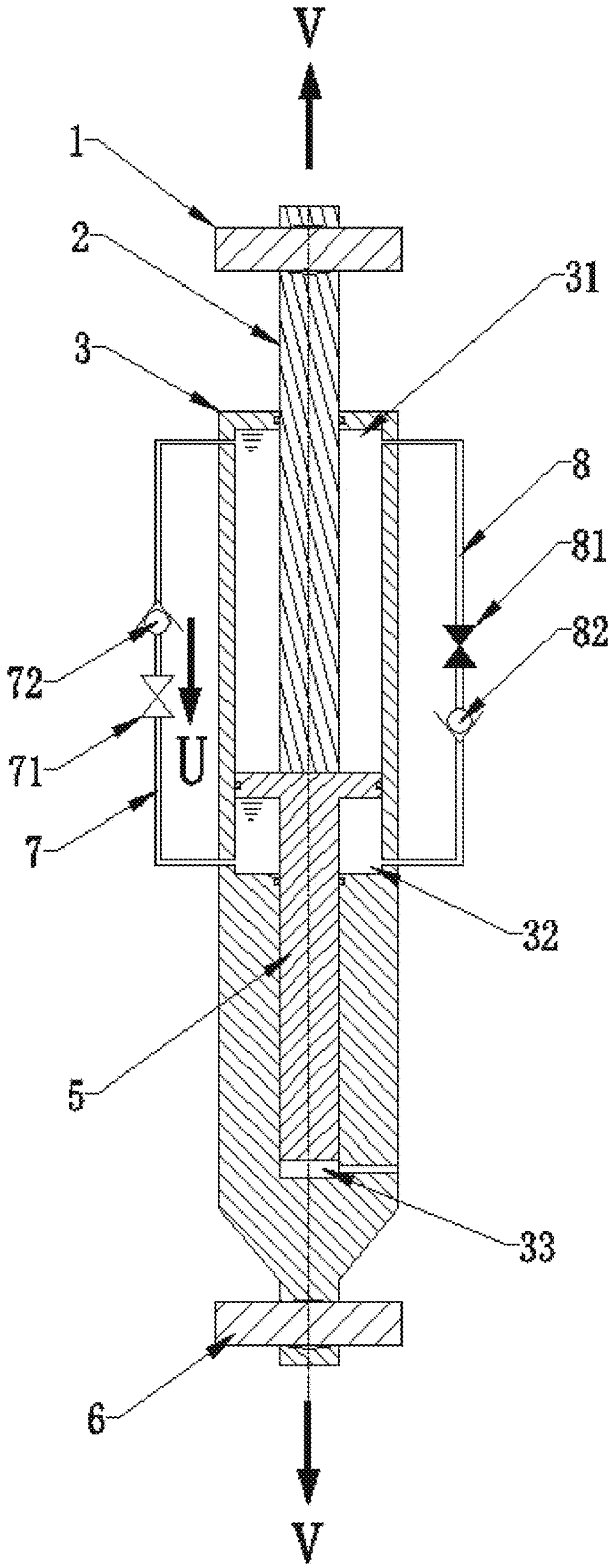
FIG. 3 is a schematic diagram 1 in unidirectional follow-up elongation of a hydraulic connecting rod.
Figure 4:
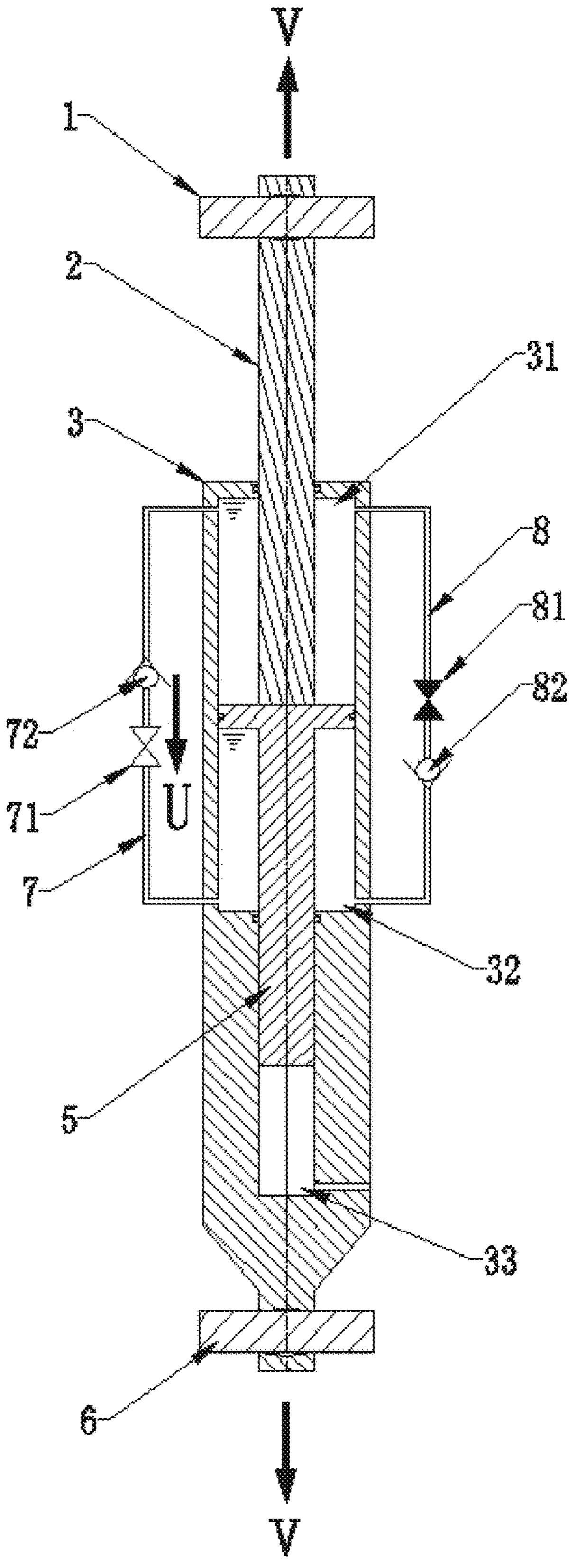
FIG. 4 is a schematic diagram 2 in unidirectional follow-up elongation of a hydraulic connecting rod.
Figure 5:
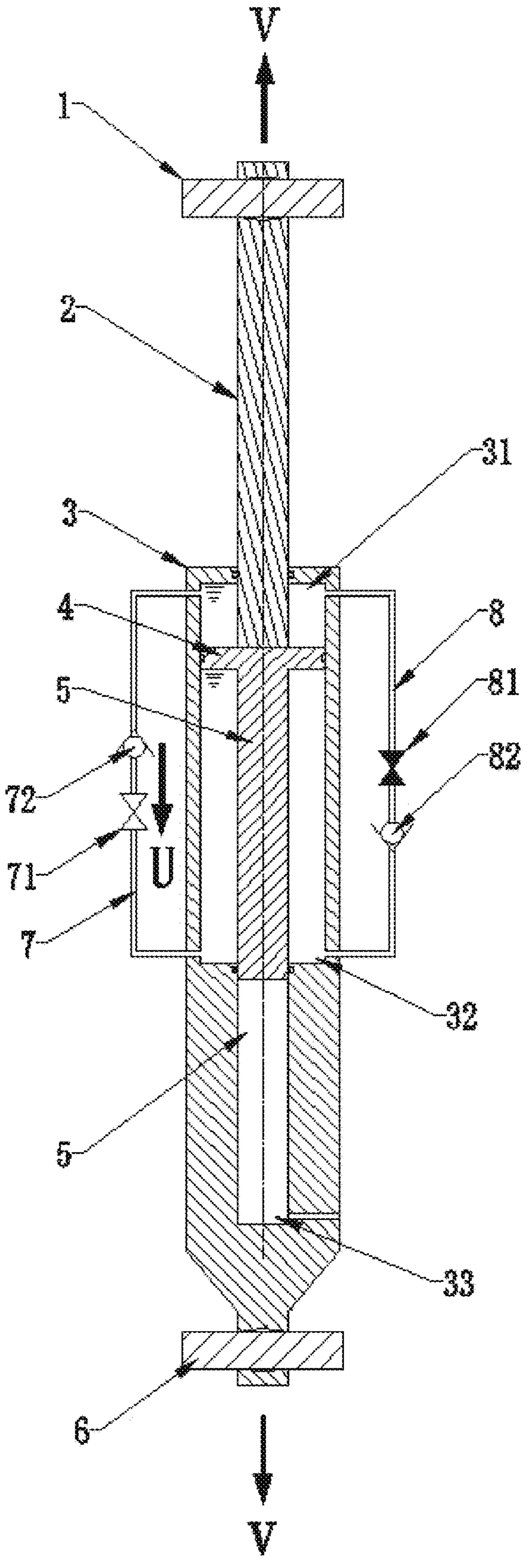
FIG. 5 is a schematic diagram 3 in unidirectional follow-up elongation of a hydraulic connecting rod.

When the connecting rod is under unidirectional follow-up elongation, as shown in FIG. 3 to FIG. 5, the unidirectional follow-up elongation of the connecting rod means that: the length of the connecting rod is freely elongated under the action of tension, and the length of the connecting rod remains unchanged when the tension is converted into pressure. At this moment, the straight-through valve I 71 is connected and the straight-through valve II 81 is disconnected. If the hydraulic connecting rod bears tension, the rod I 2 has a tendency to drive the piston 4 to move upward. At this moment, the pressure in the liquid cavity I 31 is increased, while the pressure in the liquid cavity II 32 is decreased to form negative pressure. The liquid media in the liquid cavity I 31 flow to the liquid cavity II 32 through the check valve I 72 and the straight-through valve I 71. The liquid media flowing out of the liquid cavity I 31 are equal to the liquid media flowing into the liquid cavity II 32. Only a small pressure difference can be formed on both sides of the piston 4 to make the piston 4 move upward. Under the action of tension, the length of the connecting rod can be freely extended. If the tension borne by the hydraulic connecting rod is converted into pressure, the liquid media in the liquid cavity II 32 cannot flow to the liquid cavity I 31 because the straight-through valve II 81 is disconnected. At this moment, the pressure in the liquid cavity I 31 is decreased to form negative pressure, and the pressure in the liquid cavity II 32 is increased sharply. An upward pressure difference is formed on both sides of the piston 4, and the pressure difference acts on the piston 4 to form an upward balance force which is balanced with the pressure borne by the hydraulic connecting rod. The piston 4 cannot move. However, under the action of the pressure, the length of the connecting rod remains unchanged.

Figure 6:
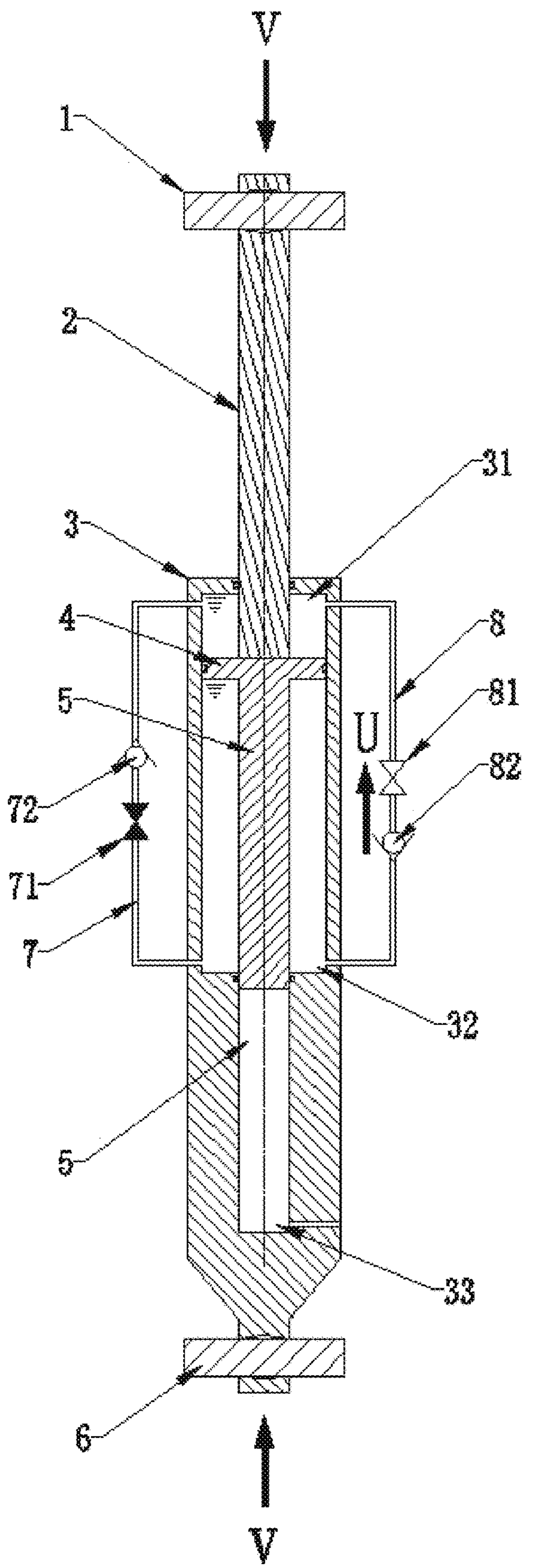
FIG. 6 is a schematic diagram 1 in unidirectional follow-up shortening of a hydraulic connecting rod.
Figure 7:
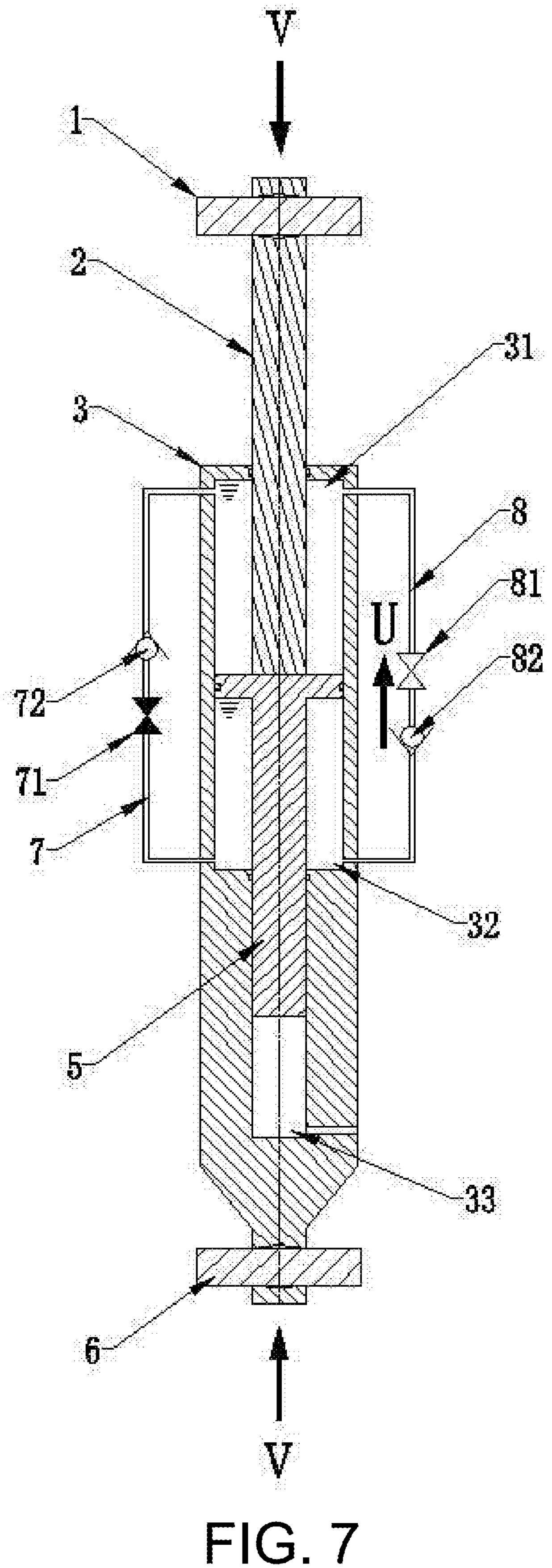
FIG. 7 a schematic diagram 2 in unidirectional follow-up shortening of a hydraulic connecting rod.
Figure 8:
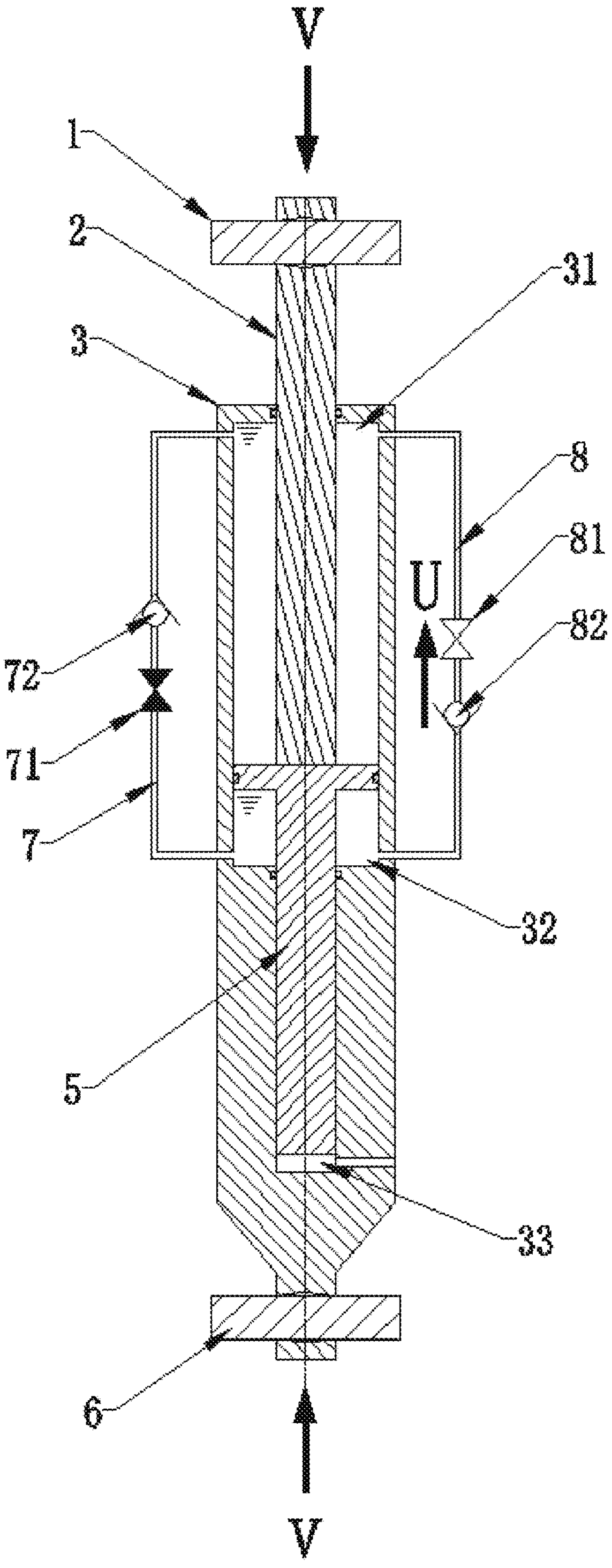
FIG. 8 is a schematic diagram 3 in unidirectional follow-up shortening of a hydraulic connecting rod.

When the connecting rod is under unidirectional follow-up shortening, as shown in FIG. 6 to FIG. 8, the unidirectional follow-up shortening of the connecting rod means that: the length of the connecting rod is freely shortened under the action of the pressure, and the length of the connecting rod remains unchanged when the pressure is converted into tension. At this moment, the straight-through valve I 71 is disconnected and the straight-through valve II 81 is connected. If the hydraulic connecting rod bears pressure, the rod I 2 has a tendency to drive the piston 4 to move downward. At this moment, the pressure in the liquid cavity I 31 is decreased to form negative pressure, while the pressure in the liquid cavity II 32 is increased. The liquid media in the liquid cavity II 32 flow to the liquid cavity I 31 through the check valve II 82 and the straight-through valve II 81. The liquid media flowing out of the liquid cavity II 32 are equal to the liquid media flowing into the liquid cavity I 31. Only a small pressure difference can be formed on both sides of the piston 4 to make the piston 4 move downward. Under the action of tension, the length of the connecting rod can be freely shortened. If the pressure borne by the hydraulic connecting rod is converted into tension, the liquid media in the liquid cavity I 31 cannot flow to the liquid cavity II 32 because the straight-through valve I 71 is disconnected. At this moment, the pressure in the liquid cavity I 31 is increased sharply, and the pressure in the liquid cavity II 32 is decreased to form negative pressure. A downward pressure difference is formed on both sides of the piston 4, and the pressure difference acts on the piston 4 to form a downward balance force which is balanced with the tension borne by the hydraulic connecting rod. The piston 4 cannot move. However, under the action of the tension, the length of the connecting rod remains unchanged.

The present application further relates to an anti-roll method that adopts the adjustable torsion bar system: when the railway vehicle is driven on a straight rail, the adjustable torsion bar system is controlled to be in a bidirectional anti-rolling state, and the adjustable torsion bar system provides the bidirectional anti-rolling torque; and when the railway vehicle is driven on a curve rail, the adjustable torsion bar system is controlled to be in a unidirectional anti-rolling state, and the adjustable torsion bar system may not prevent the railway vehicle from tilting to the inner side of the curve. Once the railway vehicle has a tendency to roll to the outer side of the curve, the adjustable torsion bar system provides the unidirectional anti-rolling torque to prevent the railway vehicle from rolling to the outer side of the curve to ensure the driving safety.

As shown in FIG. 1, when the railway vehicle is driven on a straight rail, the left straight-through valve I 171 and the left straight-through valve II 181 on the left connecting rod 10 are controlled to be in a disconnected state, and the length of the left connecting rod 10 is kept unchanged; and the right straight-through valve I 371 and the right straight-through valve II 381 on the right connecting rod 30 are controlled to be in a disconnected state, and the length of the right connecting rod 30 is kept unchanged. At this moment, the adjustable torsion bar system provides the bidirectional anti-rolling torque, and no matter the rolling tendency of the railway vehicle to the left or right, the adjustable torsion bar system can prevent the rolling of the railway vehicle to ensure driving safety.

Figure 9:
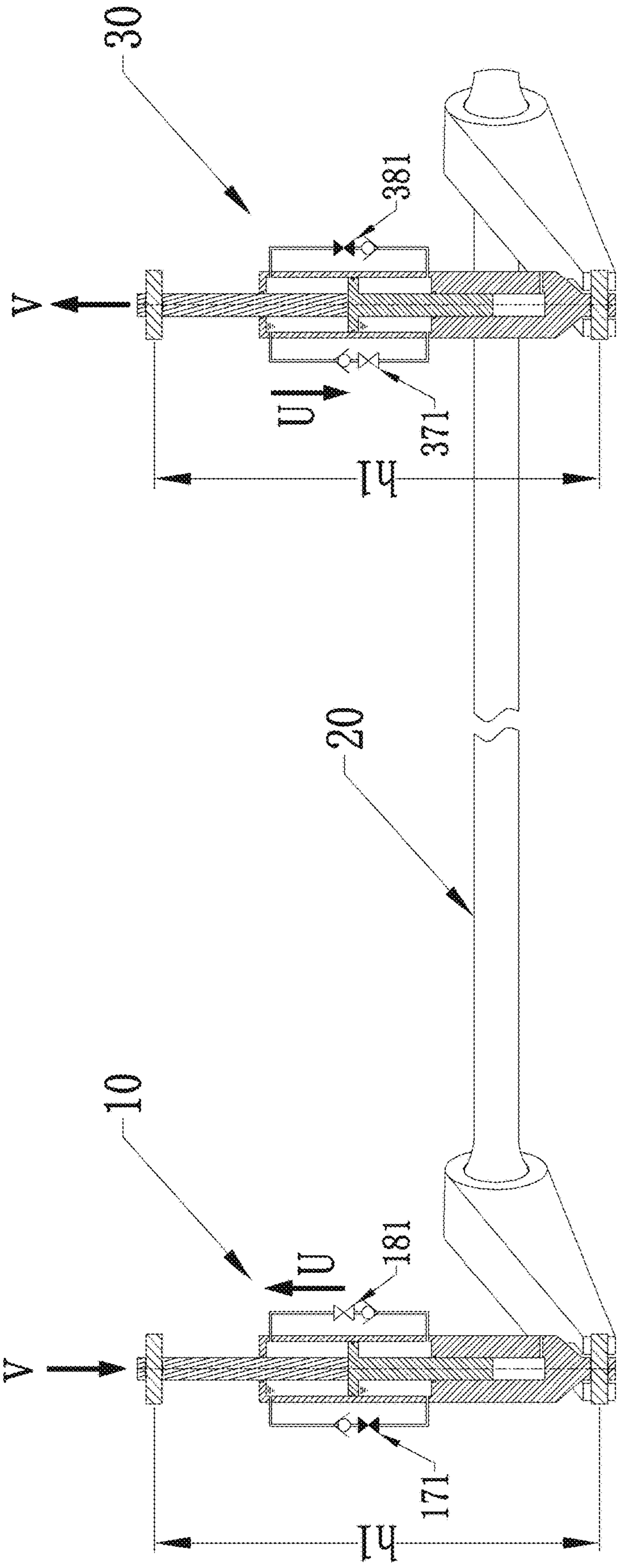
FIG. 9 is a schematic diagram when an adjustable torsion bar system begins to tilt to the left.
Figure 10:
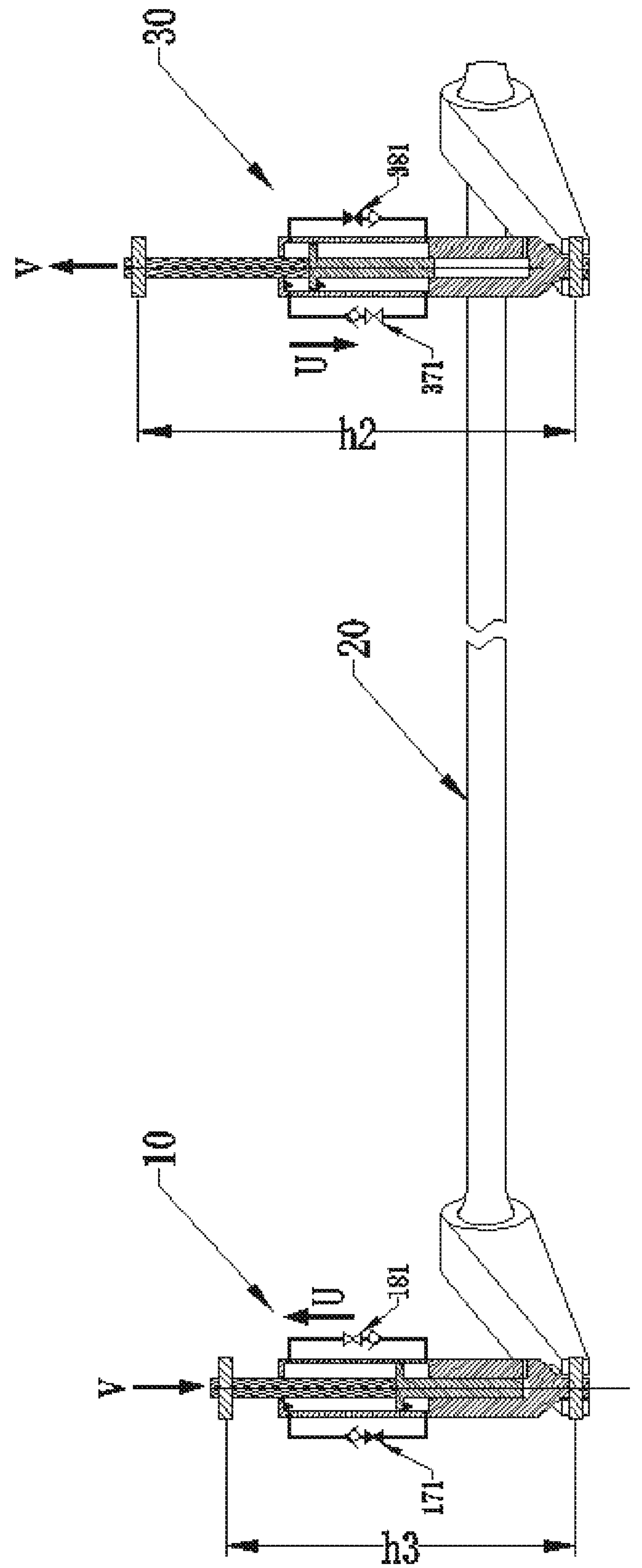
FIG. 10 is a schematic diagram when an adjustable torsion bar system tilts to the left to a maximum angle.

In the process of driving on the left-turning curve, the adjustable torsion bar system is shown in FIG. 9 to FIG. 12:

As shown in FIG. 9 to FIG. 10, when the railway vehicle enters a left-turning transition curve, the lengths of the left connecting rod 10 and the right connecting rod 30 are equal, which are h1. The left straight-through valve I 171 and the left straight-through valve II 181 on the left connecting rod 10 are controlled to be in a disconnected state, and the length of the left connecting rod 10 is kept unchanged; or the left straight-through valve I 171 on the left connecting rod 10 is controlled to be in a disconnected state, the left straight-through valve II 181 is controlled to be in a connected state, and the left connecting rod 10 is controlled to be in a unidirectional follow-up shortening state; the right straight-through valve I 371 on the right connecting rod 30 is controlled to be in a connected state, the right straight-through valve II 381 is controlled to be in a disconnected state, and the right connecting rod 30 is controlled to be in a unidirectional follow-up elongation state. The railway vehicle actively tilts to the left to balance the centrifugal force. At this moment, the length of the left connecting rod 10 in the adjustable torsion bar system remains unchanged, or the left connecting rod is under unidirectional follow-up shortening as the railway vehicle tilts to the left; the right connecting rod 30 is under unidirectional follow-up elongation as the railway vehicle tilts to the left; and the adjustable torsion bar system is matched with the railway vehicle to tilt to the left. Because the gravity component force after tilting is not enough to balance the centrifugal force, if the railway vehicle rolls to the right due to the influence of the centrifugal force, transverse wind or uneven rail, the left connecting rod 10 cannot be elongated, the right connecting rod 30 cannot be compressed, and the torsion bar 20 is twisted. Thus, a unidirectional anti-rolling torque to prevent the railway vehicle from rolling to the right is generated to prevent the railway vehicle from rolling to the right.

As shown in FIG. 10, when the railway vehicle is driven on the main rail on the left-turning curve, the length of the left connecting rod 10 is kept as h1, or after shortening, the length of the left connecting rod is shortened from h1 to h3; and after the right connecting rod 30 is elongated, the length of the right connecting rod is elongated from h1 to h2. At this moment, the left straight-through valve I 171 and the left straight-through valve II 181 on the left connecting rod 10 are controlled to be in a disconnected state, and the length of the left connecting rod 10 is kept unchanged; the right straight-through valve I 371 and the right straight-through valve II 381 on the right connecting rod 30 are controlled to be in a disconnected state, and the length of the right connecting rod is kept as h2. At this moment, the adjustable torsion bar system provides the bidirectional anti-rolling torque, and no matter the rolling tendency of the railway vehicle to the left or right, the adjustable torsion bar system can prevent the rolling of the railway vehicle to ensure driving safety.

Figure 11:
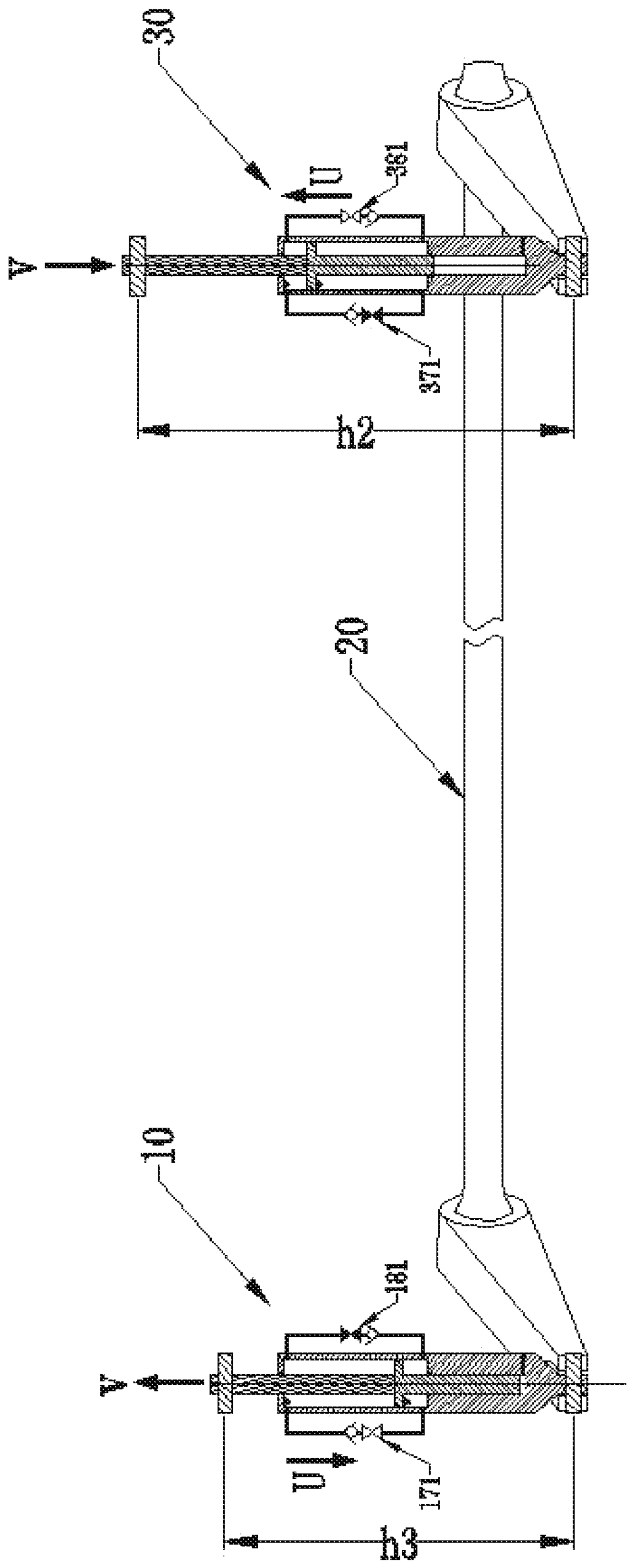
FIG. 11 is a schematic diagram when an adjustable torsion bar system begins to reset after tilting to the left.
Figure 12:
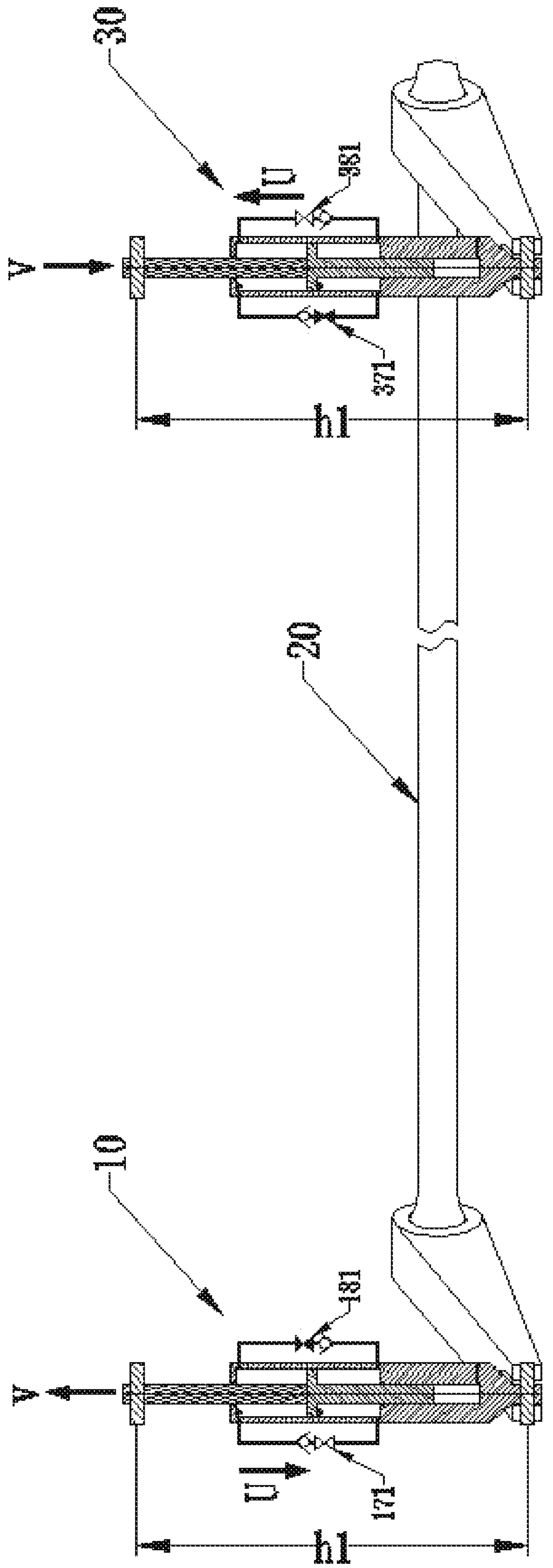
FIG. 12 is a schematic diagram when an adjustable torsion bar system resets to a horizontal position after tilting to the left.

As shown in FIG. 11 to FIG. 12, when the railway vehicle leaves the main rail on the left-turning curve and enters a left-turning transition curve, the left straight-through valve I 171 on the left connecting rod 10 is controlled to be in a connected state, the left straight-through valve II 171 is controlled to be in a disconnected state, and the left connecting rod 10 is controlled to be in a unidirectional follow-up elongation state; and the right straight-through valve I 371 on the right connecting rod 30 is controlled to be in a disconnected state, the right straight-through valve II 381 is controlled to be in a disconnected state, and the right connecting rod 30 is controlled to be in a unidirectional follow-up shortening state. At this moment, the adjustable torsion bar system provides a left anti-rolling torque only to prevent the railway vehicle from rolling to the left, without preventing the railway vehicle from returning to a horizontal state from a left tilting state.

When the railway vehicle leaves the left-turning transition curve and enters a straight line, after the left connecting rod 10 is elongated, the length of the left connecting rod is elongated from h3 to h1; and after the right connecting rod 30 is shortened, the length of the right connecting rod is shortened from h2 to h1. At this moment, the left straight-through valve I 171 and the left straight-through valve II 181 on the left connecting rod 10 are controlled to be in a disconnected state, and the length of the left connecting rod 10 is kept unchanged; and the right straight-through valve I 371 and the right straight-through valve II 381 on the right connecting rod 30 are controlled to be in a disconnected state, and the length of the right connecting rod 30 is kept unchanged. At this moment, the adjustable torsion bar system provides the bidirectional anti-rolling torque.

Figure 13:
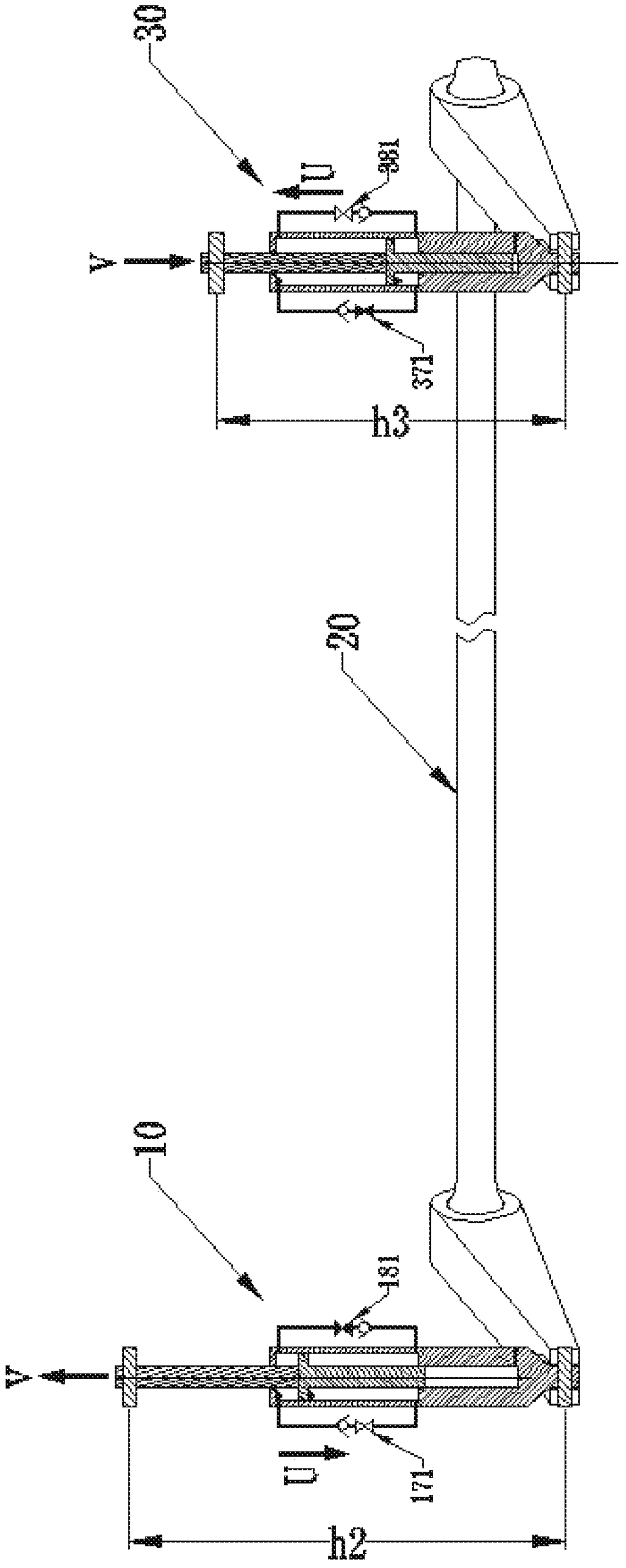
FIG. 13 is a schematic diagram when an adjustable torsion bar system tilts to the right to a maximum angle.

In the process of driving on the right-turning curve, the adjustable torsion bar system is shown in FIG. 12 to FIG. 15:

As shown in FIG. 12 to FIG. 13, when the railway vehicle enters a right-turning transition curve, the lengths of the left connecting rod 10 and the right connecting rod 30 are equal, which are h1. The left straight-through valve I 171 on the left connecting rod 10 is controlled to be in a connected state, the left straight-through valve II 181 is controlled to be in a disconnected state, and the left connecting rod 10 is controlled to be in a unidirectional follow-up elongation state; the right straight-through valve I 371 and the right straight-through valve II 381 on the right connecting rod 30 are controlled to be in a disconnected state, and the length of the right connecting rod 30 is kept unchanged; or the right straight-through valve I 371 on the right connecting rod 30 is controlled to be in a disconnected state, the right straight-through valve II 381 is controlled to be in a connected state, and the right connecting rod 30 is controlled to be in a unidirectional follow-up shortening state. At this time, the adjustable torsion bar system may not prevent the railway vehicle from rolling to the right, and only provides a left anti-rolling torque to prevent the railway vehicle from rolling to the left.

As shown in FIG. 13, when the railway vehicle is driven on the main rail on the right-turning curve, after the left connecting rod 10 is elongated, the length of the left connecting rod is elongated from h1 to h2; the length of the right connecting rod 30 is kept as h1, or after shortening, the length of the right connecting rod is shortened from h1 to h3. At this moment, the left straight-through valve I 171 and the left straight-through valve II 171 on the left connecting rod 10 are controlled to be in a disconnected state, and the length of the left connecting rod 10 is kept as h2; and the right straight-through valve I 371 and the right straight-through valve II 381 on the right connecting rod 30 are controlled to be in a disconnected state, and the length of the right connecting rod 30 is kept unchanged. At this moment, the adjustable torsion bar system provides the bidirectional anti-rolling torque, and no matter the rolling tendency of the railway vehicle to the left or right, the adjustable torsion bar system can prevent the rolling of the railway vehicle to ensure driving safety.

Figure 14:
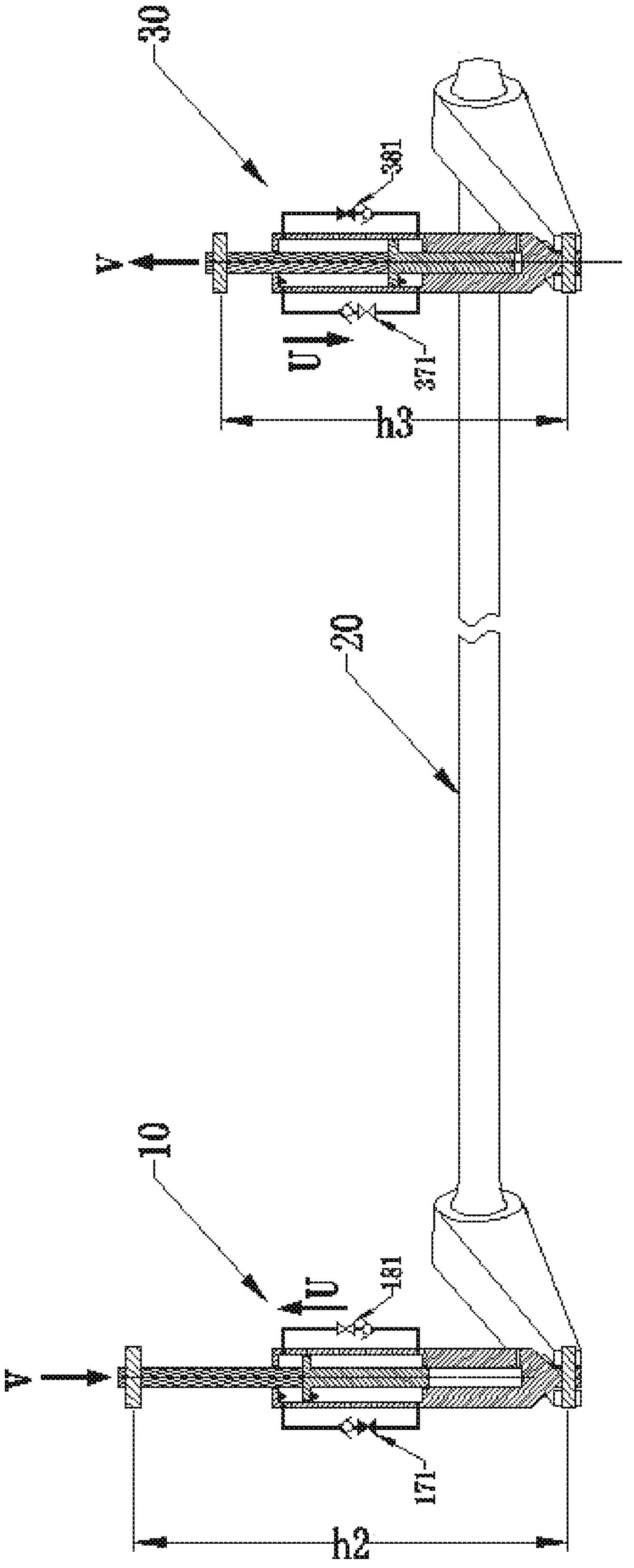
FIG. 14 is a schematic diagram when an adjustable torsion bar system begins to reset after tilting to the right.
Figure 15:
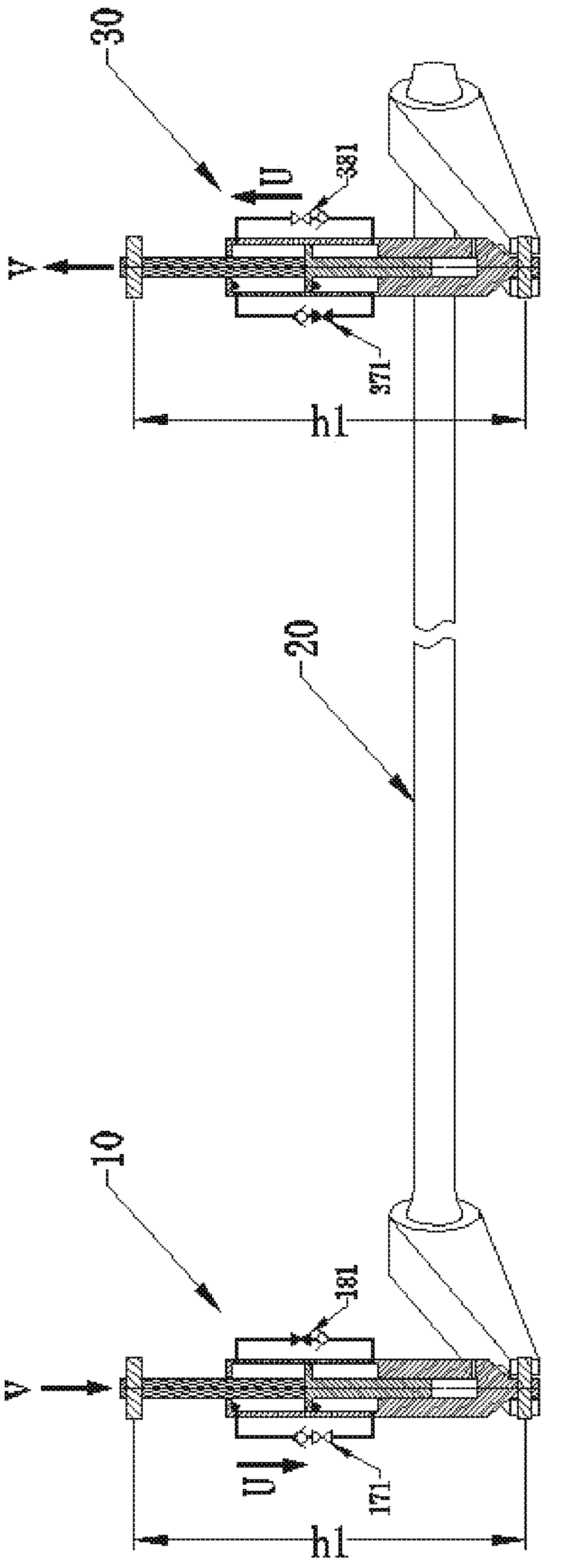
FIG. 15 is a schematic diagram when an adjustable torsion bar system resets to a horizontal position after tilting to the right.

As shown in FIG. 14 to FIG. 15, when the railway vehicle leaves the main rail on the right-turning curve and enters a right-turning transition curve, the left straight-through valve I 171 on the left connecting rod 10 is controlled to be in a disconnected state, the left straight-through valve II 171 is controlled to be in a connected state, and the left connecting rod 10 is controlled to be in a unidirectional follow-up shortening state; the right straight-through valve I 371 and the right straight-through valve II 381 on the right connecting rod 30 are controlled to be in a disconnected state, and the length of the right connecting rod 30 is kept unchanged; or the right straight-through valve I 371 is controlled to be in a connected state, the right straight-through valve II 381 is controlled to be in a disconnected state, and the right connecting rod 30 is controlled to be in a unidirectional follow-up elongation state. At this time, the adjustable torsion bar system only provides a right anti-rolling torque to prevent the railway vehicle from rolling to the right, without preventing the railway vehicle from returning to the horizontal state from the right tilting state.

When the railway vehicle leaves the right-turning transition curve and enters a straight line, after the left connecting rod 10 is shortened, the length of the left connecting rod is shortened from h2 to h1; the length of the right connecting rod 30 is kept as h1, or elongated from h3 to h1. At this moment, the left straight-through valve I 171 and the left straight-through valve II 171 on the left connecting rod 10 are controlled to be in a disconnected state, and the length of the left connecting rod 10 is kept unchanged; and the right straight-through valve I 371 and the right straight-through valve II 381 on the right connecting rod 30 are controlled to be in a disconnected state, and the length of the right connecting rod 30 is kept unchanged. At this moment, the adjustable torsion bar system provides the bidirectional anti-rolling torque.

In conclusion: the present invention has the beneficial effects: the adjustable torsion bar system is formed through the adjustable hydraulic connecting rods; and by controlling the flow of the liquid media, the characteristics of the hydraulic connecting rods are changed so that the length of the connecting rods has the characteristics of unchanged, unidirectional follow-up elongation or unidirectional follow-up shortening. Thus, the anti-rolling torsion bar system can provide the bidirectional anti-rolling torque or unidirectional anti-rolling torque to satisfy the safety driving requirements of the railway vehicle on different rails.

The above embodiments are merely used for illustration of the present invention, and not intended to limit the present invention. Various changes or transformations can also be made by those skilled in the art without departing from the spirit and the scope of the present invention. Therefore, all equivalent technical solutions shall also belong to the protection scope of the present invention, and the protection scope of the present invention shall be defined by the claims.

What is claimed is:

1. An adjustable torsion bar system, comprising: a torsion bar, a left connecting rod and a right connecting rod; the torsion bar is fixed on a bogie or a vehicle body; both ends of the torsion bar are hinged with one end of the left connecting rod and one end of the right connecting rod respectively; and another end of the left connecting rod and another end of the right connecting rod are hinged with both sides of the vehicle body or the bogie respectively, wherein the left connecting rod and the right connecting rod are adjustable hydraulic connecting rods, a length of the connecting rods is capable of being transformed between a state of fixedness, a state of unidirectional follow-up elongation, or a state of unidirectional follow-up shortening so that the adjustable torsion bar system provides a bidirectional anti-rolling torque or a unidirectional anti-rolling torque, wherein when a railway vehicle is driven on a straight rail or the railway vehicle does not need to actively tilt, the adjustable torsion bar system is controlled to be in a bidirectional anti-rolling state, and the adjustable torsion bar system provides the bidirectional anti-rolling torque; when the railway vehicle needs to actively tilt, the adjustable torsion bar system is controlled to be in a unidirectional anti-rolling state, and the adjustable torsion bar system does not prevent the railway vehicle from tilting to an inner side of a curve, and once the railway vehicle has a tendency to roll to an outer side of the curve, the adjustable torsion bar system provides the unidirectional anti-rolling torque to prevent the railway vehicle from rolling to the outer side of the curve; and wherein when the railway vehicle is driven in a straight line, a left straight-through valve I and a left straight-through valve II of the left connecting rod are controlled to be in a disconnected state, and a length of the left connecting rod is kept unchanged; and a right straight-through valve I and a right straight-through valve II of the right connecting rod are controlled to be in a disconnected state, and a length of the right connecting rod is kept unchanged, and meanwhile the adjustable torsion bar system provides the bidirectional anti-rolling torque.

2. The adjustable torsion bar system according to claim 1, wherein each of the hydraulic connecting rods comprises: a rod body, a piston and a control component; the piston is movably arranged in the rod body to divide the rod body into a liquid cavity I and a liquid cavity II; the liquid cavity I and the liquid cavity II are filled with liquid media; The liquid cavity I and the liquid cavity II are connected or disconnected through the control component and a flow channel so that the length of the connecting rods is unchanged, is freely elongated or shortened, or has unidirectional follow-up elongation or unidirectional follow-up shortening.

3. The adjustable torsion bar system according to claim 2, wherein a rod I is arranged in the liquid cavity I, one end of the rod I is connected with one side of the piston, and another end of the rod I hermetically penetrates out from the liquid cavity I; a rod II is arranged in the liquid cavity II, one end of the rod II is connected with another side of the piston, and another end of the rod II hermetically penetrates out from the liquid cavity II; the rod I and the rod II are cylindrical, and a diameter of the rod I is equal to a diameter of the rod II; the rod I and the rod II move with the piston in the rod body; and when the piston moves in the rod body, a reduced volume or an increased volume of the liquid cavity I is equal to an increased volume or a reduced volume of the liquid cavity II.

4. The adjustable torsion bar system according to claim 3, wherein the flow channel comprises a flow channel I and a flow channel II, and the control component comprises straight-through valves and check valves; a straight-through valve I and a check valve I are arranged on the flow channel I; the liquid media in the liquid cavity I can only flow to the liquid cavity II through the check valve I and the straight-through valve I; a straight-through valve II and a check valve II are arranged on the flow channel II; and the liquid media in the liquid cavity II can only flow to the liquid cavity I through the check valve II and the straight-through valve II.

5. The adjustable torsion bar system according to claim 4, wherein the length of the connecting rods remains unchanged when the straight-through valve I and the straight-through valve II are both disconnected.

6. The adjustable torsion bar system according to claim 4, wherein when the straight-through valve I is connected and the straight-through valve II is disconnected, the liquid media in the liquid cavity I can only flow to the liquid cavity II through the flow channel I, the liquid media in the liquid cavity II cannot flow to the liquid cavity I and the length of the connecting rods is freely elongated under an action of tension; and when the tension is converted into pressure, the length of the connecting rods remains unchanged, and the hydraulic connecting rod is in a state of unidirectional follow-up elongation.

7. The adjustable torsion bar system according to claim 4, wherein when the straight-through valve I is disconnected and the straight-through valve II is connected, the liquid media in the liquid cavity II can only flow to the liquid cavity I through the flow channel II, the liquid media in the liquid cavity I cannot flow to the liquid cavity II and the length of the connecting rods is freely shortened under an action of pressure; and when the pressure is converted into tension, the length of the connecting rods remains unchanged, and the hydraulic connecting rod is in a state of unidirectional follow-up shortening.

8. The anti-roll method according to claim 1, wherein when the railway vehicle is driven in a left-turning transition curve, the left straight-through valve I and the left straight-through valve II of the left connecting rod are controlled to be in a disconnected state, and the length of the left connecting rod is kept unchanged; or the left straight-through valve I is controlled to be in a disconnected state, the left straight-through valve II is controlled to be in a connected state, and the left connecting rod is controlled to be in a unidirectional follow-up shortening state; the right straight-through valve I of the right connecting rod is controlled to be in a connected state, the right straight-through valve II is controlled to be in a disconnected state, and the right connecting rod is controlled to be in a unidirectional follow-up elongation state, and meanwhile the adjustable torsion bar system does not prevent the railway vehicle from rolling leftward, and only provides a right anti-rolling torque to prevent the railway vehicle from rolling rightward;

when the railway vehicle is driven on a left-turning curve, the left straight-through valve I and the left straight-through valve II of the left connecting rod are controlled to be in a disconnected state, and the length of the left connecting rod is kept unchanged; and the right straight-through valve I and the right straight-through valve II of the right connecting rod are controlled to be in a disconnected state, and the length of the right connecting rod is kept unchanged, and meanwhile the adjustable torsion bar system provides the bidirectional anti-rolling torque to prevent the railway vehicle from rolling bidirectionally;

when the railway vehicle leaves the left-turning curve and enters a left-turning transition curve, the left straight-through valve I and the left straight-through valve II are controlled to be in a disconnected state, and the length of the left connecting rod is kept unchanged; or the left straight-through valve I of the left connecting rod is controlled to be in a connected state, the left straight-through valve II is controlled to be in a disconnected state and the left connecting rod is controlled to be in a unidirectional follow-up elongation state; and the right straight-through valve I of the right connecting rod is controlled to be in a disconnected state, the right straight-through valve II is controlled to be in a connected state and the right connecting rod is controlled to be in a unidirectional follow-up shortening state, and meanwhile the adjustable torsion bar system provides a left anti-rolling torque only to prevent the railway vehicle from rolling leftward, without preventing the railway vehicle from returning to a horizontal state from a left tilting state;

when the railway vehicle leaves the left-turning transition curve and enters a straight line, the left straight-through valve I and the left straight-through valve II of the left connecting rod are controlled to be in a disconnected state, and the length of the left connecting rod is kept unchanged; the right straight-through valve I and the right straight-through valve II of the right connecting rod are controlled to be in a disconnected state, and the length of the right connecting rod is kept unchanged, and meanwhile the adjustable torsion bar system provides the bidirectional anti-rolling torque.

9. The anti-roll method according to claim 1, wherein when the railway vehicle is driven on a right-turning transition curve, the left straight-through valve I of the left connecting rod is controlled to be in a connected state, the left straight-through valve II is controlled to be in a disconnected state and the left connecting rod is controlled to be in a unidirectional follow-up elongation state; the right straight-through valve I and the right straight-through valve II of the right connecting rod are controlled to be in a disconnected state, and the length of the right connecting rod is kept unchanged; or the right straight-through valve I is controlled to be in a disconnected state, the right straight-through valve II is controlled to be in a connected state, and the right connecting rod is controlled to be in a unidirectional follow-up shortening state, and meanwhile the adjustable torsion bar system does not prevent the railway vehicle from rolling rightward, and only provides a left anti-rolling torque to prevent the railway vehicle from rolling leftward;

when the railway vehicle is driven on a right-turning curve, the left straight-through valve I and the left straight-through valve II of the left connecting rod are controlled to be in a disconnected state, and the length of the left connecting rod is kept unchanged; the right straight-through valve I and the right straight-through valve II of the right connecting rod are controlled to be in a disconnected state, and the length of the right connecting rod is kept unchanged, and meanwhile the adjustable torsion bar system provides the bidirectional anti-rolling torque to prevent the railway vehicle from rolling bidirectionally;

when the railway vehicle leaves the right-turning curve and enters a right-turning transition curve, the left straight-through valve I of the left connecting rod is controlled to be in a disconnected state, the left straight-through valve II is controlled to be in a connected state and the left connecting rod is controlled to be in a unidirectional follow-up shortening state; the right straight-through valve I and the right straight-through valve II of the right connecting rod are controlled to be in a disconnected state, and the length of the right connecting rod is kept unchanged; or the left straight-through valve I of the left connecting rod is controlled to be in a connected state, the left straight-through valve II is controlled to be in a disconnected state and the left connecting rod is controlled to be in a unidirectional follow-up elongation state, and meanwhile the adjustable torsion bar system provides a right anti-rolling torque only to prevent the railway vehicle from rolling rightward, without preventing the railway vehicle from returning to a horizontal state from a right tilting state;

when the railway vehicle leaves the right-turning transition curve and enters a straight line, the left straight-through valve I and the left straight-through valve II of the left connecting rod are controlled to be in a disconnected state, and the length of the left connecting rod is kept unchanged; the right straight-through valve I and the right straight-through valve II of the right connecting rod are controlled to be in a disconnected state, and the length of the right connecting rod is kept unchanged, and meanwhile the adjustable torsion bar system provides the bidirectional anti-rolling torque.

* * * * *